L. C. REESE.
APPARATUS FOR EXTRACTING FROM BRAN AND THE LIKE THEIR NUTRITIOUS COMPONENTS.
APPLICATION FILED DEC. 16, 1918.

1,334,552.

Patented Mar. 23, 1920.

INVENTOR
Louis Charles Reese,

L. C. REESE.
APPARATUS FOR EXTRACTING FROM BRAN AND THE LIKE THEIR NUTRITIOUS COMPONENTS.
APPLICATION FILED DEC. 16, 1918.

1,334,552.

Patented Mar. 23, 1920.

INVENTOR.
Louis Charles Reese,

UNITED STATES PATENT OFFICE.

LOUIS CHARLES REESE, OF SAGINAW, MICHIGAN.

APPARATUS FOR EXTRACTING FROM BRAN AND THE LIKE THEIR NUTRITIOUS COMPONENTS.

1,334,552.            Specification of Letters Patent.     Patented Mar. 23, 1920.

Application filed December 16, 1918. Serial No. 267,018.

*To all whom it may concern:*

Be it known that I, LOUIS CHARLES REESE, a resident of Saginaw, in the county of Saginaw and State of Michigan, have invented new and useful Improvements in Apparatus for Extracting from Bran and the like Their Nutritious Components, of which the following is a specification.

This invention relates to improvements in apparatus for extracting by means of a solvent, usually water, from bran and other plant products their nutritious components and has for its object to obtain the largest possible amount and best quality of these products in a very simple and efficient manner and at the lowest possible costs.

The apparatus forming the object of this invention is also especially intended for carrying out my "process of extracting bran and similar products," set forth in my pending United States patent application, Serial No. 223,383, filed on March 19, 1918, which consists in treating the above named raw materials with water in a battery of extractors working according to the diffusion principle and divided into two series operated at fixed different temperatures, the fresh raw material being treated in the first series at the temperature most fitted for converting its starchy into sugary constituents by the diastatic elements contained therein, while yet preventing the coagulation of dissolved albuminous matters and any possible acidification, decomposition or putrefaction, which temperature always lies considerably below the boiling point of water, and the material exhausted in the first series being treated in the second series at the boiling point of water in order to obtain the rest of the recoverable components, the extract obtained in the second series being cooled to the temperature of the first series on its passage to the latter. In order to save steam and water for cooling, it is advantageous to use the hot extract leaving the second series for reheating the extract of the first series, the temperature of which naturally drops during its stay in the extractors, to the proper degree during its passage from one extractor to its next following one.

As the contents of each extractor pass successively through all the stages of operation, until completely exhausted, means for doing so must be provided for each extractor. For this purpose, I connect each of the intercommunicating extractors of the battery with means for its contents to be heated to and kept at the right degree, when included in the series operated at the higher temperature, say: the boiling point of water, with a refrigerator for cooling the hot extract, obtained in the series worked at the higher temperature on its passage to the second series, operated at the lower temperature, to the exact degree of the latter, and with means for maintaining this temperature in this second series. Water is the solvent usually employed, and then direct steam serves best as heating medium for the extractors, when worked at the higher temperature. As a refrigerator I use a tempering tank containing cooling elements, coils or the like through which a controllable current of cold water or any other refrigerant passes. I prefer to arrange the inlet for the extract to be cooled at the upper and the outlet for the cooled extract at the lower part of this tank, and construct it of such a size that a supply of cooled solvent is always kept therein, and the hot liquid may enter and the cooled liquid leave it independently from each other at any time. If the operation is to take place at several different temperatures, a special refrigerator will be employed for every change of temperature.

For maintaining an even and correct temperature in the series worked at the lower degree, the extract, while passing from one extractor to the next following one, is led through any suitable calorizator or heat-interchanger, as heating medium for which water treated by steam to a sufficiently high temperature may serve. But, as mentioned above, I use preferably as heating agent the hot extract obtained in the series of extractors worked at the higher temperature, which liquid—with the rare exceptions when the raw materials above named and thus the extract does not contain any coagulable albuminous matter—must be cooled before in the tempering tank to a temperature sufficiently low to prevent any coagulation of the albuminous substances dissolved in the extract to be heated, while remaining high enough for this purpose. For performing this operation, I employ a series of especially constructed and arranged "reheaters," one of which is placed between each two adjacent extractors. Each "reheater" consists of an inner tubular vessel through which the extract to be warmed passes from one extractor to the next succeeding one, and of a mantle completely surrounding this vessel and containing the hot extract serving as heating medium. The outlet from the tempering tank for the partly cooled hot extract ready for the reheaters is connected to a main provided with branches leading to the reheater mantles which intercommunicate with each other in such a manner that the hot extract is led therethrough in opposite direction to the current of the extracting liquid passing through the extractors and inner vessels of the reheaters. The mantle of every reheater is connected by a suitable pipe to the extractor from which the extract passing through its inner vessel to be reheated emanates. This pipe serves to lead the extract obtained in the series worked at the higher temperature and finally cooled in the reheaters to the lower degree of temperature required in the other series, into that extractor of the battery which contains the material practically exhausted in this latter series, in order to act therein as extracting medium, thus finishing this part of the operation. Though obviously only a number of reheaters equal to that of the extractors worked at the lower temperatures is required, I prefer to have a reheater for every extractor of the battery, partly because this arrangement is simpler in construction and working, but mainly because the inner vessels as well as the mantles of the reheaters, when not in use as described for the series of extraction worked at the lower temperature, are thoroughly washed and sterilized by passing therethrough of the boiling hot extract of the series worked at the higher temperature and at last by boiling water at each complete cycle of the operation.

Bran and similar dry vegetable substances are thoroughly mixed with water only with some difficulty, and still more so with the concentrated extract (containing up to 20% of solid matter and even more) produced in the battery. A suitable agitator is therefore required to produce the thorough mixture of bran and extracting medium necessary for the success of the operation. In order to avoid providing every extractor of the battery with such a device, I use a separate mixing vessel having the construction and functions of an extractor and so arranged and connected with the battery that extract produced in the same can be readily led from any extractor to the mixer, and that the mixture made in the latter of fresh bran and extract can be promptly transferred to any empty extractor. I found that minute particles of floury matter, mostly starch grains, which, also after the most intense mechanical treatment, adhere to bran and like products of milling, can be readily separated from the fibrous components to be rejected, by mixing the raw material with a liquid, as the extract obtained in the battery, then violently agitating the mixture, whereby these particles are loosened and become suspended in the liquid, which, when strained from the bran thus treated, retains them in suspension. For this purpose I use an agitator adapted to be alternately rotated for initially mixing the bran and extract and rocked or jerked to and fro for scrubbing the fine particles from the raw material and keeping them suspended in the liquid.

When bran or like materials are treated in the manner described in a battery of extractors, their fibrous components which are to be rejected, absorb a large amount of water and swell considerably to a porous, soft, leathery mass from which the extract can be easily and completely separated by a straining device, and which can be forced by a slight pressure thereon through comparatively small openings and tubes. Therefore I provide each extractor in its lower part above the outlet for the extract produced therein with a removable straining device, preferably a screen gate valve as described later on, and at the lowest point of its bottom with a wide outlet pipe for the exhausted bran. In this way I save the costs of removing the latter from the extractors through a manhole by hand or mechanical means and accelerate at the same time the operation.

The accompanying drawings serve for more minutely describing and explaining by way of example the essential constructional parts of the extraction battery forming the object of my invention. The example shown is an apparatus which I preferably use for the extraction of wheat bran by water, but, while I thus illustrate my invention, it must be clearly understood that I in no wise limit the same to the one construction and form shown, as it will be evident to those skilled in the art that other apparatus may be designed or existing ones may be altered in such a way that they—though differing in shape and many details—contain the essential constructional parts necessary for carrying out the particular operation which the apparatus is intended for and clearly defined in the attached claims.

Figures 1, 2 and 3 represent diagrammatically a battery of eight extractors and the reheaters appertaining thereto, intended for the extraction of bran and the like. Fig. 2 and Fig. 3 show a plan of the usual, more compact arrangement of the battery, the pipes forming the connections between the various units being represented as laying in a horizontal plane.

Figure 1:
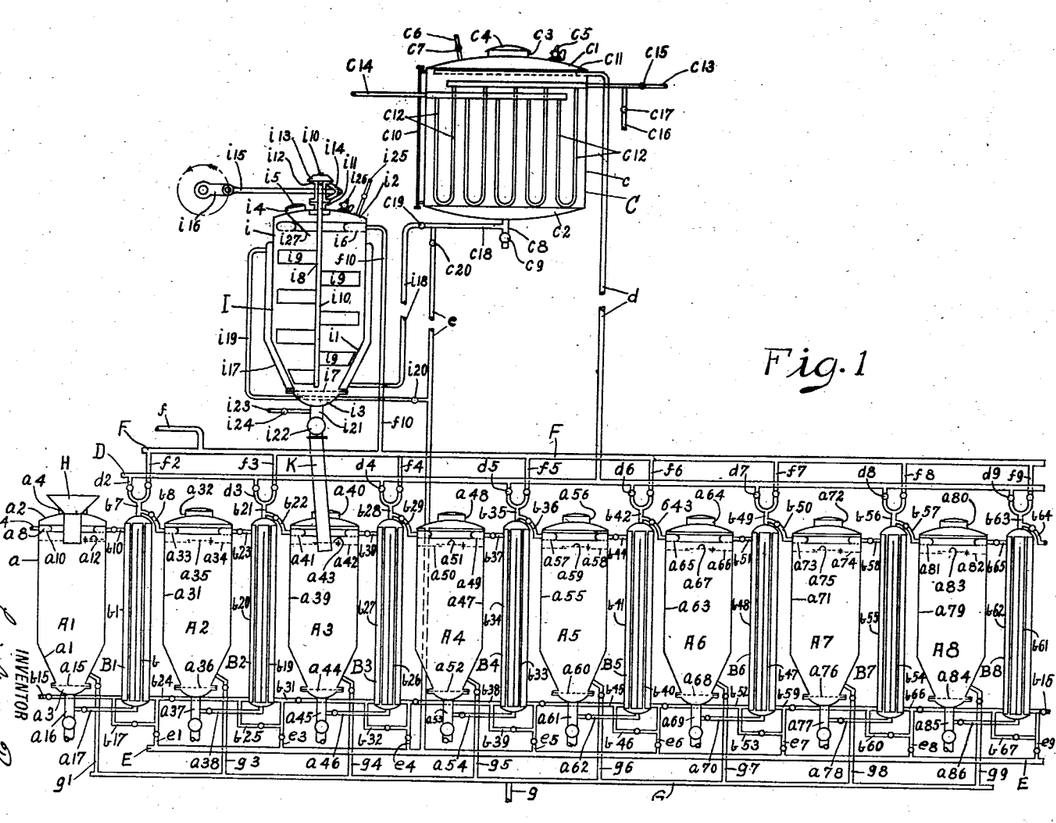
Fig. 1 shows a sectional elevation of the battery, the tempering tank and the mixer, the eight extractors being drawn in one line and the pipes and tubes connecting the different parts in superimposed position.
Figure 2:
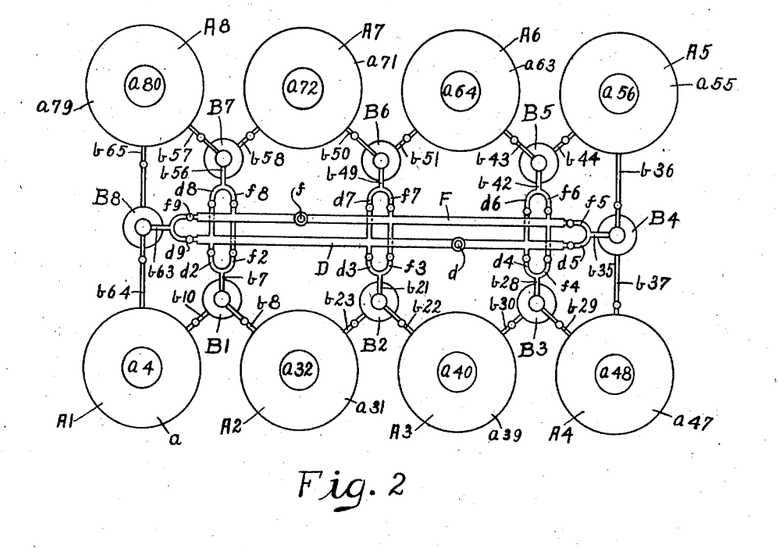
Fig. 2 illustrates the main connections at the top, and Fig. 3 those at the bottom of the extractors and reheaters.
Figure 3:
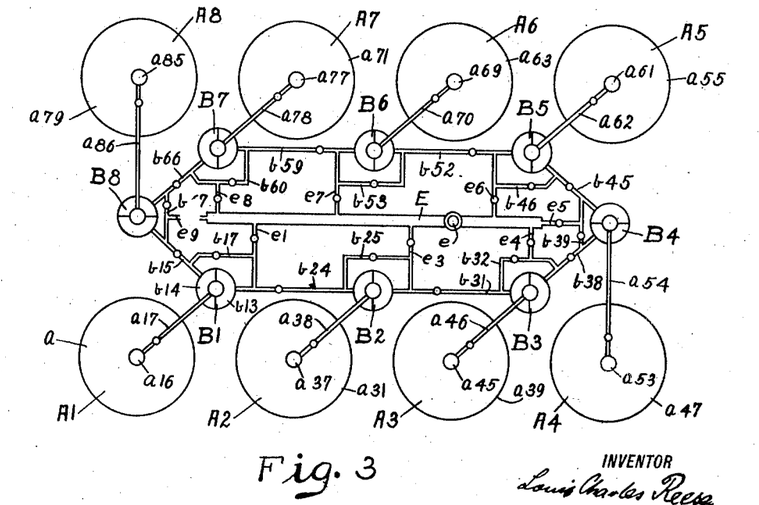

In Figs. 1, 2 and 3, $A^1$, $A^2$, $A^3$, $A^4$, $A^5$, $A^6$, $A^7$ and $A^8$ designate the extractors, $B^1$, $B^2$, $B^3$, $B^4$, $B^5$, $B^6$, $B^7$ and $B^8$ the reheaters belonging thereto, C the tempering vessel, D the main duct for leading the boiling-pot primary extract from the extractors to the latter, E the pipe-system for taking the same extract, after having been cooled in the vessel C, back into the circuit for serving as heating liquid in the reheaters, F the main duct leading the final extract obtained in the extractors $A^1$ to $A^8$ to its destination, and G the steam-main supplying them with steam. These ducts and mains with their branches and connecting pipes are shown in Fig. 1 in super-imposed position, in order to make their purpose and their connections to the various units and parts of the battery and apparatus absolutely clear, while for the same reason in Figs. 2 and 3, they are represented in a horizontal plane. In practice they are arranged much nearer to each other and to the extractors and reheaters in a position as convenient as possible for the attendant to work the battery efficiently.

H represents the portable funnel like hopper for charging the bran into the extractors, and I the rocking mixer which, as mentioned above, is only used in cases in which it is of especial advantage.

Figures 4, 5, 6, 7, 8, 9:
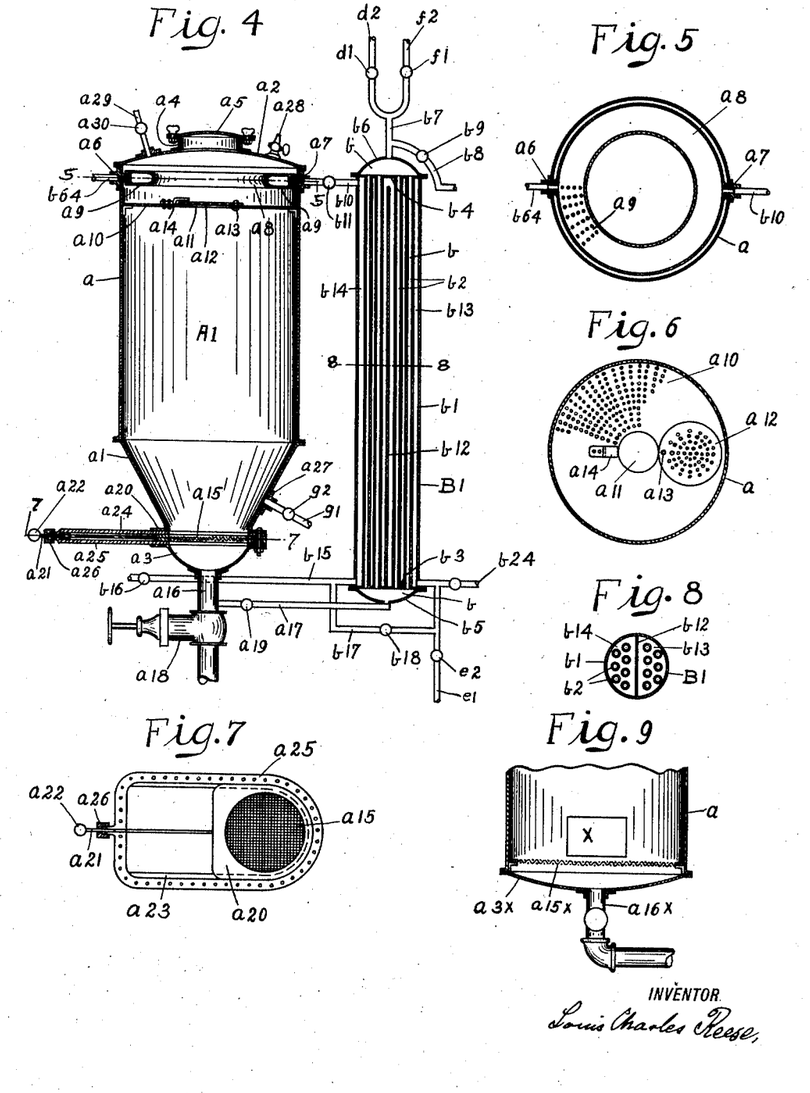
Fig. 4 is a sectional elevation of a typical extractor and reheater forming a unit of the battery.
Fig. 5 is a sectional plan of the distributer on the line 5—5 of Fig. 4.
Fig. 6 represents a plan view of the upper screen, the center disk being turned aside, in order to show the opening through which the bran is charged into the space below.
Fig. 7 is a sectional plan of the screen valve on the line 7—7 of Fig. 4.
Fig. 8 is a cross section of the reheater on the line 8—8 of the same figure.
Fig. 9 shows another arrangement of the lower screen which in this case is fixed to the wall of the extractor, the bran being removed by the manhole above the same, and the strained extract through a pipe fitted at the bottom underneath.

In Fig. 4, which represents a typical unit of the battery, the body of the extractor $A^1$ consists of the cylindrical main part $a$, the lower conical part $a^1$, the top $a^2$ and the cup-like bottom $a^3$. For charging the bran or other mass to be treated into the extractor, the top $a^2$ has in its center the manhole $a^4$ which after use is closed by the screw-on cover $a^5$. Near the upper edge of the cylinder, $a$, two flanges $a^6$ and $a^7$ are arranged which are joined within the same to the corresponding openings of the distributer $a^8$ serving for finely distributing the liquid entering the extractor and consisting of the hollow annular body $a^9$ perforated at its underside as indicated in Figs. 4 and 5.

A small distance underneath the distributer, $a^8$, a screen $a^{10}$, (Fig. 4 and Fig. 6) consisting of a perforated plate or sievelike wire-netting, is placed, tightly fitting to the walls of the cylinder, $a$, and carried by supports fixed to the same. The purpose of this screen, $a^{10}$, hereinafter called "the upper screen" is, to prevent the bran or other material under treatment from collecting and floating on the top of the treating liquid, an occurrence which especially easily happens, when direct steam is introduced into the mash; not only the perforations of the distributer, but also its hollow ring itself and its pipe connections might be blocked up in this way, a proper extraction of the material thus being made impossible. The upper screen keeps the bran in its proper place for extraction and secures the proper working of the apparatus.

For passing the bran, when charged into the extractor, into its proper place underneath the screen, $a^{10}$, the latter must be wholly or partly removable. The screen shown in the drawings has for this purpose in its center the circular opening, $a^{11}$, corresponding to the manhole, $a^4$, and covered, after the charging operation has been finished, by a somewhat larger lid, $a^{12}$, made of the same material as the screen, $a^{10}$, itself. The lid $a^{12}$ turns around the pin $a^{13}$ and is kept in its closed position by the hook, $a^{14}$, arranged at the screen, $a^{10}$, opposite to the pin, $a^{13}$.

Between the lower conical part $a^1$ of the extractor and its bottom $a^3$, a removable screen, $a^{15}$, (hereinafter called the lower screen) is arranged. It is made—like the upper screen—of perforated plate or wire-netting suitably strengthened and supported according to the weight resting thereon. The lower screen, $a^{15}$, carries the material to be extracted during the whole treatment and serves to strain the same from the extracting liquid, when the latter, having served its purpose in the extractor, is removed from the same through the out-let pipe, $a^{16}$, attached to the lowest point of the bottom, $a^3$, its branch pipe, $a^{17}$, and the reheater, $B^1$, either to the next following extractor, or to the tempering vessel, C, or to its final destination. For this purpose the main valve, $a^{18}$, of the out-let pipe $a^{16}$, must be closed, and the stopcock, $a^{19}$, of the branch pipe, $a^{17}$, opened.

When the extraction has been completed, the screen, $a^{15}$, is removed, the cock, $a^{19}$, closed and the valve, $a^{18}$, opened, whereupon the exhausted bran leaves the extractor through the pipe, $a^{16}$, which, as well as its valve, $a^{18}$, must have a bore sufficiently wide for the mass to pass through easily. I preferably construct the device for operating the removable screen, $a^{15}$, in shape of a gate valve as shown in Fig. 4 and Fig. 7. The closing shutter, $a^{20}$, of the valve forms the frame in which the screen, $a^{15}$, is fixed, and is worked by means of the rod, $a^{21}$, and the handle, $a^{22}$, in the grooves, $a^{23}$, arranged at the inside of the two valve halves, $a^{24}$, and $a^{25}$, connected by bolts and bearing the stuffing box, $a^{26}$, in which the rod, $a^{21}$, moves. The upper half, $a^{24}$, of the valve is connected to the cone like part, $a^1$, of the body of the extractor, and the lower half to the top of the cup-like bottom, $a^3$, their openings being in alinement. Thus when the rod, $a^{21}$, and thereby the shutter, $a^{20}$, are pushed in, the screen, $a^{15}$, is active, and when they are drawn out, the passage is completely free for the exhausted bran to drop and pass away through the out-let pipe, $a^{16}$.

It is obvious that the extracted material contained in the space between the screens, $a^{10}$ and $a^{15}$, can also be removed by means of a manhole or door arranged in the walls of this space above the lower screen which then may be stationery. This arrangement is shown in Fig. 9, X representing the door, $a^{15 \times}$ the stationary screen, $a^{3 \times}$ the bottom of the extractor and $a^{16 \times}$ its outlet for the strained liquid.

For introducing direct steam into the mass under treatment in the extractor, the socket, $a^{27}$, arranged at its lower part, $a^1$, is connected to the steam branch pipe $g^1$, provided with the valve $g^2$.

The exhaust-valve $a^{28}$ on the top $a^2$, of the extractor serves for removing air from the same and for relieving it, when necessary of steam- or air pressure.

If it is desired to employ air-pressure or suction in assistance to or as sole agent for moving the extracting liquid through the series of extractors, the pipe, $a^{29}$, provided with the regulating valve, $a^{30}$, is fitted to the top, $a^2$, and connected to an air-pump suitable for this purpose.

The reheater $B^1$, (Fig. 4 and Fig. 8) consists of the tubular vessel $b$, through which the extract passes while being reheated, and the mantle, $b^1$, surrounding the tubes, $b^2$, of $b$ and containing the heating liquid. The open ends of the tubes, $b^2$, are set in the plates, $b^3$ and $b^4$, which form at the same time the bottom and top of the mantle, $b^1$. The cup-like bottom part, $b^5$ of the tubular vessel $b$, is attached to the plate $b^3$ and, being connected at its lowest point to the outlet pipe, $a^{17}$, leading the extract from the extractor, $A^1$, to the reheater, $B^1$, serves to distribute this liquid into the several tubes, $b^2$, in which the same is reheated by the surrounding heating liquid contained in the mantle, $b^1$.

The plate $b^4$ is fixed to the dome like top part, $b^6$, of the tubular vessel, $b$, from which the reheated extract, collected again in bulk therein, escapes through the outlet pipe, $b^7$ and enters through its branch pipe, $b^8$, provided with the stop cock, $b^9$, into the distributer of the next following extractor, $A^2$. The outlet pipe, $b^7$, serves also to conduct the primary extract to its tempering tank C and the final extract to its destination and is forked in its upper part for this purpose, one member of the same being connected by the stop cock, $d^1$, to the branchpipe, $d^2$, of the main duct, D, for the primary extract, and the other member by the stop cock, $f^1$ to the branch pipe, $f^2$, of the main duct, F, for the final extract.

The circular wall of the mantle $b^1$ carries at its upper part the pipe, $b^{10}$, provided with the stop-cock, $b^{11}$, and connected at its other end to the flange, $a^7$, of the distributer, $a^8$, of the extractor $A^1$, for leading into the same the primary extract, which has served as heating liquid in $B^1$ and the previous reheaters and has thus been cooled to the required degree, in order to act henceforth as extracting liquid at the lower temperature. The mantle, $b^1$, is divided by the partition wall, $b^{12}$, nearly reaching to the top plate, $b^4$, but leaving sufficient space for the unrestricted passage of the heating liquid, into two compartments, $b^{13}$ and $b^{14}$, in consequence of which arrangement the liquid entering from the reheater, $B^2$, through the pipe, $b^{24}$, into the lower part of the compartment, $b^{13}$, rises upward in the same, crosses the top of the wall, $b^{12}$, and passes downward the compartment, $b^{14}$, which it leaves at its lowest part through the pipe, $b^{15}$, for the mantle of the reheater, $B^8$, of the previous unit. For regulating the flow of the liquid, the pipe, $b^{15}$, is provided with the cock, $b^{16}$. The two pipes, $b^{15}$ and $b^{24}$, are connected at points between their regulating cocks and their entrance points into the mantle, $b^1$, by the bent tube, $b^{17}$, provided with the cock, $b^{18}$, so that the two compartments, $b^{13}$ and $b^{14}$, can be worked at will either separately or as one. The tube, $b^{17}$, is joined between its cock, $b^{18}$, and its junction with the pipe, $b^{24}$, to the branch pipe $e^1$, through which, after opening its stop cock, $e^2$, fresh heating liquid coming through the main E from the tempering tank C enters the reheater $B^1$.

In Figs. 1, 2 and 3 the various parts of the first unit, the extractor $A^1$ and the reheater $B^1$, are marked in exactly the same way as in Fig. 4, while in the seven other units of the battery, $A^2$ to $A^8$ and $B^2$ to $B^8$, they bear in addition to the letter $a$ or $b$ respectively, consecutive numerals starting with $A^2$ and $B^2$ with the first ones following the last ones used in Fig. 4 for $A^1$ and $B^1$. Only one character is used to designate a connecting or branch pipe and the cock belonging thereto.

In the extractor $A^2$, $a^{31}$ signifies its body $a^{32}$ the man hole, $a^{33}$ the distributer, $a^{34}$ the upper screen, $a^{35}$ the lid of the same, $a^{36}$ the lower removable screen, $a^{37}$ the outlet for the exhausted material and its gate valve, and $a^{38}$ the outlet pipe with stop cock for the extracting liquid, leading the same to the bottom part of the tubular vessel, $b^{19}$, of the reheater $B^2$, and in the latter, $b^{20}$ denotes its mantle, $b^{21}$ the outlet pipe for the extract at the top of $b^{19}$, $b^{22}$ the branch pipe of $b^{21}$ leading the extract to the extractor $A^3$, $b^{23}$ the pipe with the stop cock, connecting the upper part of the mantle, $b^{20}$, with the distributer $a^{33}$, of the extractor $A^2$ of the same unit, $b^{24}$ the pipe and stop cock connecting the lower part of the same mantle with the lower part of the mantle, $b^1$, of the reheater, $B^1$, and $b^{25}$ the pipe and stop cock connecting the pipe $b^{24}$ and the pipe $b^{31}$ leading from the mantle of the next following reheater $B^3$ to the mantle $b^{20}$ of $B^1$.

The corresponding parts of the extractor $A^3$ are: $a^{39}$, $a^{40}$, $a^{41}$, $a^{42}$, $a^{43}$, $a^{44}$, $a^{45}$ and $a^{46}$, and of the reheater $B^3$: $b^{26}$, $b^{27}$, $b^{28}$, $b^{29}$, $b^{30}$, $b^{13}$, and $b^{32}$, of the extractor $A^4$: $a^{47}$, $a^{48}$, $a^{49}$, $a^{50}$, $a^{51}$, $a^{52}$, $a^{53}$ and $a^{54}$, and of the reheater $B^4$: $b^{33}$, $b^{34}$, $b^{35}$, $b^{36}$, $b^{37}$, $b^{38}$ and $b^{39}$, of the extractor $A^5$: $a^{55}$, $a^{56}$, $a^{57}$, $a^{58}$, $a^{59}$, $a^{60}$, $a^{61}$ and $a^{62}$, and of the reheater $B^5$: $b^{40}$, $b^{41}$, $b^{42}$, $b^{43}$, $b^{44}$, $b^{45}$ and $b^{46}$, of the extractor $A^6$: $a^{63}$, $a^{64}$, $a^{65}$, $a^{66}$, $a^{67}$, $a^{68}$, $a^{69}$ and $a^{70}$, and of the reheater $B^6$: $b^{47}$, $b^{48}$, $b^{49}$, $b^{50}$, $b^{51}$, $b^{52}$ and $b^{53}$, of the extractor $A^7$: $a^{71}$, $a^{72}$, $a^{73}$, $a^{74}$, $a^{75}$, $a^{76}$, $a^{77}$ and $a^{78}$, and of the reheater $B^7$: $b^{54}$, $b^{55}$, $b^{56}$, $b^{57}$, $b^{58}$, $b^{59}$ and $b^{60}$, and of the extractor $A^8$: $a^{79}$, $a^{80}$, $a^{81}$, $a^{82}$, $a^{83}$, $a^{84}$, $a^{85}$ and $a^{86}$, and of the reheater $B^8$: $b^{61}$, $b^{62}$, $b^{63}$, $b^{64}$, $b^{65}$, $b^{66}$, and $b^{67}$.

The fork of the outlet pipe $b^{21}$ of the tubular vessel $b^{19}$ of the reheater $B^2$ is joined at one side to the branch pipe $d^3$ of the duct D leading the first extract to the tempering tank C and at the other side to the branch pipe $f^3$ of the duct F leading the final extract to its destination. The corresponding connecting branch pipes are for the outlet pipe $b^{28}$ of the reheater $B^3$: $d^4$ and $f^4$, for $b^{35}$ of $B^4$,: $d^5$ and $f^5$, for $b^{42}$ of $B^5$: $d^6$ and $f^6$ for $b^{49}$ of $B^6$: $d^7$ and $f^7$, for $b^{56}$ of $B^7$; $d^8$ and $f^8$, for $b^{63}$ of $B^8$; $d^9$ and $f^9$.

For conducting the heating liquid from the tempering tank C through the duct E into the mantle, $b^{20}$, of the reheater, $B^2$, the branch pipe, $e^3$, is joined to the pipe, $b^{25}$, forming the communication between the pipes, $b^{24}$ and $b^{31}$; the corresponding branch-pipes are, $e^4$ for $b^{32}$ of $B^3$, $e^5$ for $b^{39}$ of $B^4$, $e^6$ for $b^{46}$ of $B^5$, $e^7$ for $b^{53}$ of $B^6$, $e^8$ for $b^{60}$ of $B^7$ and $e^9$ for $b^{67}$ of $B^8$.

The steam main G is connected to the extractor $A^2$ by the pipe $g^3$, to $A^3$ by $g^4$, to $A^4$ by $g^5$, to $A^5$ by $g^6$, to $A^6$ by $g^7$ to $A^7$ by $g^8$, and to $A^8$ by $g^9$.

The tempering tank C consists of the body $c$, the top, $c^1$, and the bottom, $c^2$. The top $c^1$, carries the manhole, $c^3$, with its cover, $c^4$ the exhaust valve $c^5$, and the pipe, $c^6$, provided with the valve $c^7$, and connected to a compressed air tank, for creating air pressure in the vessel C when desired. At the lowest point of the bottom $c^2$, the outlet pipe, $c^8$, is arranged, ending in the emptying cock, $c^9$. To the side of the body, $c$ the gage glass, $c^{10}$, is fixed for measuring the quantity of liquid contained in the tank. The primary extract is pressed by the steam pressure prevailing in the extractor where the exhausted bran is lastly boiled with water under pressure, through the main D and its branch pipe into the perforated coil, $c^{11}$ arranged at a small distance underneath the top, $c^1$, and is thus distributed over the cooling elements, $c^{12}$, consisting of bent tubes and arranged in the body $c$ of the tank, C, and thereby cooled. Each of the elements, $c^{12}$, is united at one end to the inlet pipe, $c^{13}$, and at the other end to the outlet pipe $c^{14}$.

The inlet pipe, $c^{13}$, is supplied with the valve $c^{15}$ to regulate the flow of the cooling liquid through the elements and with the branch pipe, $c^{16}$, connected to the steam main and provided with the valve, $c^{17}$, for introducing steam, in case a slight heating of the liquid contained in the tank, C, should become necessary. After having attained the correct temperature, the liquid leaves the tank, C, through the tube, $c^{18}$, laterally attached to the outlet pipe, $c^8$. The tube, $c^{18}$ is divided into two branches, the one provided with the valve $c^{19}$, leading the liquid to the heating mantle of the mixer, I, and the other one, provided with the valve, $c^{20}$, communicating with the branch pipe, $e$, of the main, E, which leads the heating liquid to the reheaters of the battery.

In many cases it is possible and advantageous to employ the gravity of the liquid in the tank C, to move it through the reheaters and thereby the extract from one extractor to the next following one in the series worked at the lower temperature; and, in order to obtain this result, the tank C must be placed sufficiently high above the extractors, as is indicated in the arrangement shown in Fig. 1.

In cases where for the reason above given the use of a special mixing vessel, I, Fig. 1, is advisable, I preferably construct and arrange the same in regard to its shape and accessories as the single extractor, $A^1$ shown in Fig. 4, except that I surround the body with a heating mantle and provide an agitator, that I make the size somewhat larger in order to have some free space above the latter, and that I omit the upper screen which the agitator makes unnecessary.

The body of the mixing vessel, I, consists of the cylindrical main body, $i$, the conical lower part, $i^1$, the top, $i^2$, and the cuplike bottom, $i^3$. The fresh raw material is charged into the mixer through the manhole, $i^4$, arranged in the top $i^2$ and provided with the cover $i^5$. The concentrated extract which is mixed with the fresh bran in the vessel, I, is led from the battery of extractors through the main F and its side branch, $f^{10}$, into the distributer, $i^6$. If the gravity of the liquid in the tempering tank, C, is used to move the extract from one extractor to the following one and the last and most concentrated extract through F and $f^{10}$ into the distributer, $i^6$, the tank, C, must be placed so high above $i^6$, that these movements of the liquids are possible, as is also, as far as the space permits, indicated in Fig. 1.

For separating the final extract obtained from the material treated in the mixer, the screen valve, $i^7$, which is constructed in exactly the same way as the screen valve, $a^{15}$, the details of which are shown in Figs. 4 and 7, is interposed between the lower end of the conical part, $i^1$, and the wider upper end of the bottom $i^3$, of the mixer, I.

The screen $i^7$, also supports the raw product while being mixed with and agitated in the concentrated extract by means of the agitator, $i^8$, the active parts of which, the wing like blades, $i^9$, closely follow with their outer edges the circumference of the cylindrical part $i$, and the conical part $i^1$, of the vessel, and are fixed to the shaft, $i^{10}$, arranged in its center. The shaft $i^{10}$, is rotatably mounted in the stuffing $i^{11}$, fitted in the center of the top, $i^2$, and carried thereon by the collar, $i^{12}$, fixed to the same. The pinion, $i^{13}$, fixed to the top of the shaft, $i^{10}$, when driven by suitable gearing ordinarily used in such cases, causes the agitator to revolve. The arms, $i^{14}$, rigidly attached to the collar, $i^{12}$, serve, after the pinion, $i^{13}$, has been put out of gear, to jerk the agitator, $i^8$, violently to and fro by being pivotally connected at their outer ends by an easily removable bolt or similar quickly disconnected appliance to the connecting rod, $i^{15}$, and the crank shaft, $i^{16}$, driven by any suitable means. When, instead of a rocking, again a rotary motion is to be imparted to to the agitator, the rod, $i^{15}$, is disconnected from the arms, $i^{14}$, and the pinion, $i^{13}$, is put into mesh with its gearing.

The lower conical part, $i^1$, is completely and the cylindrical main part, $i$, of the body of the mixer, I, is nearly up to its top, $i^2$, surrounded by the heating mantle, $i^{17}$, for keeping the mash in the mixer always at the right temperature. The heating liquid employed for this purpose enters the lower part of the mantle $i^{17}$ through the pipe, $i^{18}$, connected by the cock, $c^{19}$, to the outlet pipe, $c^{18}$, of the tempering vessel, C, and leaves the upper part of the mantle, $i^{17}$, through the pipe $i^{19}$, provided with the stop cock, $i^{20}$, and communicating with the branch pipe, $e$, of the main E, leading the heating liquid into the reheaters.

The bottom, $i^3$, is fitted at its lowest point with the wide outlet tube, $i^{21}$, ending in the flanged, full-bore gate valve, $i^{22}$, and having between this valve and the bottom, $i^3$, the lateral branch pipe, $i^{23}$, provided with the stopcock, $i^{24}$. When the latter is open and the screen, $i^7$, pushed in and thus in action, the strained, final extract flows through the pipe, $i^{23}$, to its destination. When the cock, $i^{24}$, has been shut off again, and the once treated raw material is mixed with a fresh portion of concentrated extract, the resulting mash is dropped down, after the screen, $i^7$, has been withdrawn and the valve, $i^{22}$, opened, through the wide flexible tube, K, flanged to the latter or through any other suitable appliance into the empty extractor of the battery ready to be charged afresh.

In order to create pressure in the mixer, if so desired, the top, $c^2$, is fitted with the air tube, $c^{25}$, provided with a regulating valve and connected to a compressed air tank, and, for relieving it of pressure, with the exhaust valve, $i^{26}$.

For preventing the bran charged into the mixer, I, from dropping onto the distributer, $i^6$, and for forcing it to flow down the center of the vessel around the shaft, $i^{10}$, of the agitator, I preferably attach to the manhole, $i^4$, the chute, $i^{27}$.

Thermometers, pressure gages, safety valves, test cocks, faucets for the supply of hot and cold water, emptying cocks and similar appliances generally employed in this kind of plant are arranged at or fitted to the various extractors, the compartments of the reheaters, the tempering tank, mixer and mains, where and how it is deemed necessary or advisable.

The following description of the extraction of wheat bran will explain by way of example the starting and working of the apparatus:

The bran is to be treated in five extractors with water of about 60° C., in two at its boiling point under atmospheric pressure and in the last one under a pressure of about 1½ atmospheres at about 110° C. The extract obtained in the three last extractors, the primary extract, is pressed into the tempering tank C by steam pressure, and enters the last of the extractor series working at 60° C., after serving as heating medium in its reheaters, by gravity under the pressure of the liquid in the tank C, the whole battery working under the diffusion system, that is—the more diluted extract entering an extractor at its upper part driving out the more concentrated extract contained therein at the bottom.

For starting work in the plant, in which, in order to avoid mistakes, all the cocks and valves are carefully closed, the water which is to serve as extracting medium, is heated in the tempering tank C by steam passed into the elements $c^{12}$ through the inlet pipe $c^{13}$ after opening the valve $c^{17}$ of the steam pipe $c^{16}$; at the same time the walls and accessories of the extractor $A^1$ and the reheater $B^1$ which represent a considerable quantity of metal, are tepefied by letting steam into the vessels, the shutter of the screen valve $a^{15}$ is pushed into its active position, the manhole $a^4$ is opened, the lid $a^{12}$ of the upper screen $a^{11}$ is turned, and the hopper H placed into the position as shown in Fig. 1. As soon as the temperature of the water in the tank C has risen to 70° C. or a little over, the cocks $c^{20}$ of the pipe $c^{18}$ leading into $e$, $e^2$ of the branch pipe, $e^1$, of the main E, and $b^{11}$ of the pipe $b^{10}$ are opened, and the water flows then through the pipe $e$, the main E, the pipe $e^1$ and the portion of $b^{24}$ situated between its cock and the mantle $b^1$ of the reheater $B^1$ into the latter which it leaves by the pipe $b^{10}$, entering the extractor $A^1$ through its distributer $a^8$.

Simultaneously the bran is gradually charged through the hopper H into the space between the lower screen $a^{15}$ and the upper screen $a^{10}$. As soon as this operation has been finished, the hopper H is removed and the lid $a^{12}$ is turned around to cover the opening of the screen $a^{10}$. After the level of the water entering through the distributer $a^8$ has reached nearly the latter, its flow is stopped by shutting off the cock $e^2$ of the pipe $e^1$, and the manhole $a^4$ is closed.

The mash in the extractor $A^1$ is then left to digest for say forty minutes. Meanwhile fresh water is heated as before in the tempering tank C which operation is repeated until the bran in the extractor $A^1$ has been treated five times with the hot water from the same.

The extractor $A^2$ and the reheater $B^2$ are now tepefied, the lower screen $a^{36}$ is placed inside the extractor, the manhole $a^{32}$ is uncovered, and the lid $a^{35}$ of the upper screen $a^{34}$ is turned aside to make room for the neck of the hopper H. After the time for the digestion in the extractor $A^1$ has elapsed, the cocks of the pipes $e^3$ and $b^{23}$ are opened; thereupon the hot water coming from the tank C through the main E enters the mantle $b^{20}$ of the reheater $B^2$ the air escaping therefrom through the pipe $b^{23}$ and the distributer $a^{33}$. As soon as the liquid begins to drip from the latter, indicating that the mantle $b^2$ is filled, the cock of the pipe $b^{23}$ is shut off, and the cocks of the pipes $b^{24}$, $a^{17}$ and $b^8$ are turned on. The hot water of the tank C passes then through the main E, the pipe $e^3$, the part of $b^{31}$ adjoining the reheater $B^2$, up the one and down the other compartment of its mantle $b^{20}$, the pipe $b^{24}$, the mantle $b^1$ of the reheater $B^1$ and the pipe $b^{10}$ into the distributer $a^8$ and thus into the extractor $A^1$, driving the extract, produced therein by the first treatment of the bran, through the pipe $a^{17}$, the tubular vessel $b$ of the reheater $B^1$, in which it is rewarmed by the hot water passing through its mantle $b^1$, the pipes $b^7$ and $b^8$ and the distributer $a^{33}$ into the extractor $A^2$ where it mixes at once with the bran gradually charged through the hopper H into the space between the screens $a^{34}$ and $a^{36}$. After $A^2$ has been duly charged, the cock $e^3$ is turned off.

While then the mixture in $A^2$ of fresh bran and first extract made in $A^1$, and the mixture in $A^1$ of once extracted bran and fresh water from C are left to digest at about 60° C., the extractor $A^3$ is made ready by pushing the lower screen $a^{44}$ inside, opening the manhole $a^{40}$, turning the lid $a^{43}$ of the upper screen $a^{42}$, tepefying the vessels $A^3$ and $B^3$, placing the hopper H into position and filling the mantle $b^{27}$ of the reheater $B^3$ with hot water from C by opening the cocks of the pipes $e^4$ and $b^{30}$, closing the latter again as soon as the liquid begins to appear in the distributer $a^{41}$. The bran is then charged into the extractor $A^3$, while simultaneously with the starting of this operation the cocks of the pipes $b^{31}$, $a^{38}$ and $b^{22}$, are opened, the hot water from C passing through the pipe $e^4$, a part of $b^{38}$, the mantle, $b^{27}$ of $B^3$, the pipe, $b^{31}$, the mantle, $b^{20}$ of $B^2$, the pipe, $b^{24}$, the mantle, $b^1$ of $B^1$, and the pipe, $b^{10}$, connecting the latter to the distributer, $a^8$, into the extract or $A^1$ from which it drives the second extract through the pipe, $a^{17}$, the tubular vessel, $b$ of $B^1$, the pipes, $b^7$ and $b^8$, and the distributer, $a^{33}$, into the extractor $A^2$, pressing the first extract contained therein through the pipes, $a^{37}$ and $a^{38}$, the tubular vessel, $b^{19}$ of $B^2$, the pipes $b^{21}$ and $b^{22}$, and the distributer, $a^{41}$, into the freshly charged extractor, $A^3$. Thereafter, the cock of the pipe $e^4$ is turned off, the cover is put on the manhole, $a^{40}$, and the three charged extractors are allowed to rest for the digestion and diffusion of their contents.

During this time the extractor $A^4$ and reheater $B^4$ are prepared, as described, and in due course the former is charged with bran and extract entering from $A^3$; for this purpose the cocks of the pipes $e^5$, $b^{38}$, $a^{46}$ and $b^{29}$ are turned on. The hot water from C passing through $e^5$, $b^{34}$ of $B^4$, $b^{38}$, $b^{27}$ of $B^3$, $b^{31}$, $b^{20}$ of $B^2$, $b^{24}$, $b^1$ of $B^1$ and $b^{10}$ into distributer, $a^8$, and thus into the extractor $A^1$, drives through the pipes, $a^{16}$ and $a^{17}$, the tubular vessel, $b$ of $B^1$, the pipes $b^7$ and $b^8$ and the distributer, $a^{33}$, the third extract obtained from the bran contained in the extractor, $A^1$, into the extractor, $A^2$, thereby presses the second extract of the bran in the latter through the pipes $a^{37}$ and $a^{38}$, the tubular vessel $b^{19}$ of $B^2$, the pipes, $b^{21}$ and $b^{22}$, and the distributer, $a^{41}$ into $A^3$, then the first extract of the bran contained therein through the pipes $a^{45}$ and $a^{46}$, the tubular vessel, $b^{26}$ of $B^3$, the pipes, $b^{28}$ and $b^{29}$, and the distributer, $a^{49}$, into $A^4$, where it at once mixes with the fresh bran entering this extractor; whereafter the manhole, $a^{48}$, of the latter is closed, and the cock of the pipe, $e^5$, for hot water from C turned off.

During the time of digestion in the four extractors $A^1$, $A^2$, $A^3$, and $A^4$, the fifth unit, $A^5$ and $B^5$, is made ready for charging. Thereafter, the cocks of the pipes $e^6$, $b^{45}$, $a^{54}$, and $b^{36}$ being turned on, the hot water entering from C through the main E, its branch pipe $e^6$ and a part of the pipe $b^{52}$, into the mantle $b^{41}$ of $B^5$, passes from the latter through the pipe $b^{45}$, the mantle $b^{34}$ of $B^4$, the pipe $b^{38}$, the mantle $b^{27}$ of $B^3$, the pipe $b^{31}$, the mantle $b^{20}$ of $B^2$, the pipe $b^{24}$, the mantle $b^1$ of $B^1$, the pipe $b^{10}$ and the distributer $a^8$ into the extractor $A^1$, dislocating the fourth extract contained therein and forcing it through the pipes $a^{16}$ and $a^{17}$, the tubular vessel $b$ of $B^1$, the pipes, $b^7$ and $b^8$, and the distributer $a^{33}$ into $A^2$, and thereby the third extract of this extractor through the pipes $a^{37}$ and $a^{38}$, the tubular vessel $b^{19}$ of $B^2$, the pipes $b^{21}$ and $b^{22}$, and the distributer $a^{41}$ into $A^3$, the second extract from the latter through the pipes $a^{45}$ and $a^{46}$, the tubular vessel $b^{26}$ of $B^3$, the pipes $b^{28}$ and $b^{29}$ and the distributer $a^{49}$ into $A^4$, and the first extract contained therein through the pipes $a^{53}$ and $a^{54}$, the tubular vessel $b^{33}$ of $B^4$, the pipes $b^{35}$ and $b^{36}$, and the distributer, $a^{57}$, into the fresh bran being charged into $A^5$. This operation completed the cover is put on the manhole $a^{56}$, the cock of pipe $e^6$ closed and the five charged extractors are left for the usual time undisturbed for their contents to digest and diffuse.

The extract contained in the extractor $A^5$ has been used for successively treating five charges of fresh bran and, being then of sufficient concentration for evaporation in the vacuum pans, is transferred to the store tank for the same. For this purpose, the cocks of the pipes $e^6$, $a^{62}$ and $f^6$, are turned on, the hot water from C passing through the reheaters $B^5$, $B^4$, $B^3$, $B^2$ and $B^1$ into $A^1$ and the extracts from each extractor of the series $A^1$ to $A^4$ into the immediately succeeding one in the same course in which at the immediately preceding step the extractor $A^5$ was charged, whereby the final extract is forced from the latter through the pipe, $a^{62}$, the tubular vessel, $b^{40}$ of $B^5$, the pipes, $b^{42}$ and $f^6$, the main, F, and its branch pipe, $f$, to its destination, whereupon the cocks, $e^6$ and $f^6$, are shut off again.

While the contents of the five extractors, $A^1$, to $A^5$, are again digesting, the extractors, $A^7$ and $A^8$, are filled with boiling water, the boiling water in $A^7$, after closing its manhole, $a^{72}$, being further heated under pressure by introducing steam from the main G through its branch pipe $g^8$ until it has reached the desired temperature, say 115° C., and the unit $A^6$ and $B^6$, is made ready for the fresh charge.

For this operation the cocks of the pipes, $e^7$, $b^{52}$, and $b^{43}$, are opened; the hot liquid coming through $e^7$ and the main E from the tempering tank C passes then successively through the reheaters $B^6$, $B^5$, $B^4$, $B^3$, $B^2$ and $B^1$ into the extractor $A^1$, pressing the sixth extract contained therein into $A^2$, the fifth from $A^2$ into $A^3$, the fourth from $A^3$ into $A^4$, the third from $A^4$ into $A^5$, and the second from $A^5$ through the distributor $a^{65}$ into $A^6$, where it mixes at once with the fresh bran simultaneously entering the same. The manhole, $a^{64}$, and the cock of the pipe, $e^7$, are then closed again, and thereupon also the manhole $a^{80}$ of the extractor $A^8$. All connections between the unit $A^1$ and $B^1$ and the unit $A^2$ and $B^2$ are then interrupted by turning off the cocks of the pipes $b^{24}$ and $b^{10}$ leading the heating liquid from the reheater $B^2$, through the mantle $b^1$ of the reheater $B^1$ into the extractor $A^1$, and of the pipe $b^8$ leading the extract passing from the extractor $A^1$ through the pipe $a^{17}$, the cock of which remains open, and the tubular vessel $b$ of the reheater $b^1$ and the lower end of the outlet tube $b^7$ into the extractor $A^2$.

Meanwhile the pressure in the extractor $A^7$ will have attained sufficient force to press liquid from the extractors upward into the tempering tank C. If at the temperature of the water—115° C. being given as example—the pressure in $A^7$ is not capable to perform this work, compressed air of the required power may be used to assist therein, for which purpose each extractor is fitted with an airpipe like $a^{29}$ shown in Fig. 4. The cocks of the pipes, $d^2$, $b^{64}$, $a^{86}$, $b^{57}$ and $a^{78}$ are opened; the water boiling under pressure in $A^7$ passes then immediately through the tubular, vessel $b^{54}$, of the reheater $B^7$, the pipe $b^{57}$ and the distributer $a^{81}$ into the extractor $A^8$, and the water boiling under ordinary pressure from the latter through the pipe $a^{86}$, the tubular vessel, $b^{61}$, of the reheater $B^8$, the pipe, $b^{64}$, and the distributer, $a^8$, into the extractor $A^1$, forcing the first primary extract contained therein through the pipe, $a^{17}$, the tubular vessel $b$ of the reheater $B^1$, its outlet pipe $b^7$, the branch pipe $d^2$, the main D, its upper branch pipe $d$ and the perforated coil $c^{11}$ into the tempering tank C, the contents of which are then cooled to the required temperature, after the steam valve, $c^{17}$, has been turned off, by turning on the water cock $c^{15}$, thus providing the elements $c^{12}$ with cold water from the main $c^{13}$. The quantity of liquid entering C at each operation is measured by means of the gage $c^{10}$, and, as soon as a quantity equal to the amount necessary for a charge of fresh bran plus the contents of the mantle of one reheater has passed into C, the flow is interrupted; this is done in the present operation by turning off the cocks of the pipes, $d^2$ and $a^{78}$.

A fresh supply of boiling water is then introduced into $A^7$; its temperature and pressure are then raised to the same degree as before by introduction of steam through $g^8$, while the bran in $A^1$ extracted hitherto at 60° C. is now being treated with water at or near its boiling point. After a suitable time, say 20 minutes, the pressure in $A^7$ will be again high enough; the cocks of the pipes $d^2$ and $a^{78}$ are opened again, and the second primary extract forced from the extractor, $A^1$, into the tempering tank, C, until it is equal in quantity to that of the final extract taken from the extractor $A^5$. Thereafter the cocks of the pipes, $d^2$, $a^{78}$, $b^{57}$ and $a^{86}$, are closed, the cover of the manhole, $a^{72}$, is removed and the extractor, $A^7$, emptied of water whereupon it is allowed to cool, until the time for its charge arrives.

In the meantime the liquid contained in the tempering tank C has attained the correct temperature for being used as heating liquid in the reheater, and the time becomes due for removing the final extract from $A^6$. For this purpose the cocks of the pipes $e^7$, $b^{23}$, $a^{70}$, and $f^7$ are turned on; the heating liquid passes then from the tempering tank C and the main E through the reheaters $B^6$, $B^5$, $B^4$, $B^3$ and $B^2$ into the extractor $A^2$, driving the sixth extract contained therein into $A^3$, the fifth from $A^3$ into $A^4$, the fourth from $A^4$ into $A^5$, the third from $A^5$ into $A^6$ and the first and final extract from $A^6$ through the pipe $a^{70}$, the tubular vessel $b^{47}$ of the reheater $B^6$, the outlet pipe, $b^{49}$, the tube $f^7$, the main F and its branch pipe $f$ to its destination. The cocks of the pipes $e^7$ and $f^7$ are then closed again, and the five extractors $A^2$—$A^6$ rest for the digestion at 60° C. of their contents for a short time, say 20 minutes, while the boiling water in $A^8$ is heated to 115° C. by introducing steam through $g^9$, and the unit, $A^7$ and $B^7$, still warm from the previous use, is prepared for charging by pushing the lower screen $a^{76}$ into its active position and filling the mantle $b^{55}$ with heating liquid by opening the cocks of the pipes, $e^8$ and $b^{58}$, and closing them again as soon as the liquid appears in the distributor $a^{73}$. In due course the cocks of the pipes, $e^8$, $b^{59}$, $a^{70}$ and $b^{50}$ are then opened, whereupon the heating liquid from C passes through $e^8$ and the reheaters $B^7$, $B^6$, $B^5$, $B^4$, $B^3$ and $B^2$ into the extractor $A^2$, forcing the seventh extract therefrom into $A^3$, the sixth from $A^3$ into $A^4$, the fifth from $A^4$ into $A^5$, the fourth from $A^5$ into $A^6$ and the second from $A^6$ into $A^7$, where it meets the fresh bran simultaneously charged thereinto. The lid $a^{75}$ of the upper screen $a^{74}$ is then turned over the opening of the latter, the cover of the manhole $a^{72}$ is put on, the cock of the pipe $e^8$ is turned off, thus stopping the entrance of the heating liquid into the battery, and the unit, $A^2$, $B^2$, is separated from the unit $A^3$, $B^3$, by closing the cocks of the pipes $b^{31}$, $b^{22}$ and $a^{38}$. The contents of the five extractors $A^3$—$A^7$ are then left for digestion at 60° C.

The mantle, $b^{20}$, of the reheater, $B^2$, contains then a mixture of plain water and the first and second primary extract obtained from the extractor $A^1$, it is the best plan to return it to its circuit, when the first primary extract is removed from $A^2$ to the tempering vessel C. This is done by opening the cocks of the pipes $d^3$, $a^{38}$, $b^{23}$, $b^{25}$, $b^{24}$, $b^{17}$, $b^{10}$, $b^{64}$ and $a^{86}$. The pressure in $A^8$ being of sufficient power, the boiling water contained therein enters $A^1$ through the pipes, $a^{86}$, the tubular vessel, $b^{61}$, the pipe, $b^{64}$, and the distributer, $a^8$, passes therefrom through the pipe, $b^{10}$, into the mantle $b^1$, the two compartments of which have been connected by opening the cock of the pipe, $b^{17}$, then through the pipes, $b^{24}$ and $b^{25}$, into the two compartments of the mantle $b^{20}$, thereupon through $b^{23}$ and the distributer, $a^{33}$, into $A^2$, and from here through the pipe, $a^{38}$, the tubular vessel, $b^{19}$, the pipes $b^{21}$ and $d^3$, the main D and its branch pipe $d$ into the tempering tank C. As soon as the quantity of liquid equal to the contents of the mantle $b^1$ has entered this vessel, the cocks of the pipes $b^{23}$, $b^{17}$ and $b^{10}$ are closed, and the cocks of the pipes $a^{17}$ and $b^8$ are turned on. The water boiling under pressure in $A^8$ drives then the third primary extract of $A^1$ through the pipe $a^{17}$, the tubular vessel $b$ of $B^1$, the pipe $b^8$ and the distributer $a^{33}$ into $A^2$ and from there in the same way as before the first primary extract into C.

The current of the liquid is stopped by turning off the cocks of the pipes $d^3$ and $a^{86}$, when a quantity of liquid equal to that necessary for the charge of fresh bran has entered the tank C. The extractor $A^8$ receives then a fresh charge of hot water, and its temperature and pressure are raised as before. After the contents of the extractors $A^1$ and $A^2$ have been digested with boiling water for some time, say 20 minutes as before, the cocks of the pipes $d^3$ and $a^{86}$ are turned on again, whereupon the water boiling under pressure in $A^8$ forces the fourth primary extract contained in $A^1$ into $A^2$ and thus the second primary extract from $A^2$ into C, the flow of the liquid being interrupted by turning off the above cocks, as soon as a quantity of liquid equal to that taken as final extract from $A^6$ has entered the tank C. Then the cocks of the pipes $b^{64}$ and $a^{86}$ are also closed, the manhole $a^{80}$ is uncovered, and its extractor $A^8$ and the reheater $B^8$ drained of the hot water contained therein. After cooling down for a short time, this unit is then made ready for a fresh charge. The contents of the extractor $A^2$ are kept at the boiling point of water, until this cycle is started again immediately after the following charge of fresh bran has been made, and those of the extractor $A^1$ are heated during this time to 115° C. by introducing steam through $g$.

The final extract contained in $A^7$ is meanwhile ready for its removal from the battery; the cocks of the pipes $e^8$, $b^{30}$, $a^{78}$ and $f^8$ are then opened; the heating liquid flows from C through E, $e^8$, and the mantles of the reheaters $B^7$, $B^6$, $B^5$, $B^4$ and $B^3$ into the extractor $A^3$, from which the seventh extract made from the bran therein passes into $A^4$, the sixth from $A^4$ into $A^5$, the fifth from $A^5$ into $A^6$, the third from $A^6$ into $A^7$, and the first and final extract from the latter through the pipe $a^{78}$, the tubular vessel $b^{54}$, the outlet pipe $b^{56}$, the pipe $f^8$, the main F and its branch pipe $f$ to its destination. The cocks of the pipes $e^8$ and $f^8$ are then shut off, and the contents of the five extractors $A^3$ to $A^7$ are again left for digestion lasting about 20 minutes, whereafter the cocks of the pipes $e^9$, $b^{66}$, $a^{78}$ and $b^{57}$ are opened. The heating liquid flows then from C into E and passes from its branch pipe $e^9$ through the reheaters $B^8$, $B^7$, $B^6$, $B^5$, $B^4$, and $B^3$ into $A^3$, the eighth extract being then forced from $A^3$ into $A^4$, the seventh from $A^4$ into $A^5$, the sixth from $A^5$ into $A^6$, the fourth from $A^6$ into $A^7$ and the second from $A^7$ into $A^8$, where it mixes with the charge of fresh bran. This operation finished, the manhole $a^{80}$ is closed and the cock of the pipe $e^9$ turned off; the extractors $A^4$ to $A^8$ rest then for the digestion of their contents at 60° C.

The unit $A^3$, $B^3$ is disconnected from the unit $A^4$, $B^4$, by closing the cocks of the pipes $b^{29}$ and $b^{38}$. The pressure in the extractor $A^1$ being sufficiently strong, the cocks of the pipes $a^{17}$, $b^8$, $b^{23}$, $b^{25}$, $b^{31}$, $b^{32}$, $b^{30}$ and $d^4$ are turned on for pressing, as described before, the contents of the mantle $b^{27}$ of the reheater $B^3$ into the extractor $A^3$ and from there an equal quantity into the tank C, whereupon the cocks of the pipes $b^{23}$ and $b^{30}$ are shut off, and the cocks of the pipes $a^{38}$, $b^{22}$ and $a^{46}$ are turned on. The fifth primary extract of the bran in $A^1$ by means of boiling water drives then the third extract from $A^2$ into $A^3$ and the first primary extract contained in the latter through the pipe $a^{46}$, the tubular vessel $b^{26}$ of $B^3$, its outlet pipe $b^{28}$, the pipe $d^4$, the main D and its branch pipe $d$ into the tempering tank C. As soon as the required quantity has entered C, the cocks of the pipes $d^4$ and $a^{17}$ are turned off, and the extractors $A^2$ and $A^3$ are left for the bran contained therein to digest with the respective primary extracts of the preceding extractors, while the extractor $A^1$ is filled up with boiling water, and then steam introduced into the same for raising the temperature and pressure therein as required. After the same interval as before the cocks of the pipes $d^4$ and $a^{17}$ are turned on again; the pressure in $A^1$ forces then the sixth primary extract contained therein into $A^2$, thus the fourth from $A^2$ into $A^3$ and the second from $A^3$ into the tempering tank C; as soon as the due quantity of this primary extract has entered the latter vessel, the cocks of the pipes $d^4$, $a^{17}$, $b^8$ and $b^{24}$ are closed, the lower screen $a^{15}$ is drawn out of the extractor into its outer casing and the cock of the outlet pipe $a^{16}$ opened, whereupon by the pressure prevailing in the extractor $A^1$ the now fully extracted bran contained therein is forced through $a^{16}$ out of the same and led to a filtering or straining apparatus or conveyer or similar arrangement (not shown) suitable for disposing of and working up this material.

The cover of the manhole $a^4$ is then removed from the empty extractor $A^1$, the interior of the latter and that of the reheater $B^1$ belonging thereto cleaned, and both are then prepared for a fresh charge which takes place as soon as the second extract made in $A^8$ is ready to be used for the same.

All the units of the battery are then successively worked, discharged, cleaned, prepared for the fresh charge, charged and worked again as described, the bran contained in each extractor being treated ten times with extracting liquid at 60° C.—starting with the fifth extractor, from which the first final extract was removed in order to be used,—four times with boiling water and twice with water boiling under pressure.

If the mixer I, the purpose and working of which is readily understood from its description, is used, it is operated in the same manner as described above for an extractor charged through the hopper H with fresh bran during its first and second extraction at 60° C. The bran would then be treated 12 times at this temperature.

In the described way not only always absolutely sterile water is used for the extraction, but also every extractor and the reheater belonging thereto are sterilized each time when the treatment of the raw material in the former is completed. The various temperatures in all parts of the apparatus are easily regulated and always kept at such a point, that no undesired decomposition of the raw material,—as in the case of the bran, the formation of lactic and other acids and the putrid decomposition of the proteid matter contained therein,—can take place; that the whole amount of the components of the raw material, which are originally soluble in the extracting medium and become soluble and dissolved during the passage of the latter through the extractors, is obtained, and that components of the raw material dissolved in the extracting liquid at the lower temperature which would become insoluble and precipitated if exposed to the higher temperature used in the other part of the battery,—as in the case of bran, water-soluble, coagulable proteid matter,—remain in solution in the final extract produced. The battery described requires the smallest possible amount of water for the extraction and as cooling medium, and of steam for heating, while its working is simple, and no manual labor is needed, but for the charging of the raw material into the same.

Other raw materials and other solvents suitable for their extraction can be used in this kind of extraction battery with the same good results.

I claim:

1. In an apparatus for extracting bran and the like, the combination of a battery of extractors, intercommunicating with each other and adapted to be worked in series at different definite temperatures, means connected to each of said extractors adapted to heat its contents to the degree necessary for the series worked at the higher temperature means connected to each of said extractors for cooling the hot extracting liquid on its passage from the said series worked at the higher temperature to that worked at the lower temperature to the degree necessary for the latter series, and means for evenly maintaining the temperature in this series.

2. In an apparatus for extracting bran and the like, the combination of a battery of extractors intercommunicating with each other and adapted to be worked in two series, one at the boiling point of water and the other below the same, a steam main leading from a boiler and connected by branch pipes to each of said extractors for heating its contents to boiling point, when worked in the first series, a tempering tank consisting of the tank body containing the liquid to be treated in order to serve as extracting liquid in the said second series, and of heat exchanging elements situated in the said tank and provided with means to supply them with a cooling medium, when the temperature of the said liquid is to be lowered, and with a heating liquid, when the temperature is to be raised, the inlet for this liquid into and its outlet from the said tank body being connected with each extractor of the said battery by tubes provided with stop cocks and so arranged that the extracting liquid can be led from any of the said extractors to the said tank to be treated, and can be returned therefrom after treatment to any other extractor of the said battery as in the manner and for the purpose described.

3. In an apparatus for extracting bran and the like, the combination of a battery of extractors intercommunicating with each other and adapted to be worked in two series having fixed different temperatures with a suitable number of reheaters, each consisting of an inner tubular vessel containing the liquid to be reheated and a mantle surrounding the said inner vessel and containing the heating liquid, the inlet into the said inner vessel of the liquid to be rewarmed being connected to the outlet for the extracting liquid from the suitably nearest extractor of the said battery, and the outlet for the reheated liquid from the said inner vessel being connected to the inlet for this liquid into the extractor following next to the last named extractor, the said mantles intercommunicating with each other, their inlets for the heating liquid being connected to the outlets for the extracting liquid from the extractors of the said battery in such a manner that from any extractor the hot extracting liquid leaving the said series of extractors worked at the higher temperature can be led thereinto, and each mantle being provided with a tube communicating with the inlet for the extracting liquid of that extractor from which the inner vessel of the same reheater receives the liquid to be reheated, and adapted to lead the extracting liquid obtained in the said series of extractors worked at the higher temperature and now duly cooled in the reheaters back into the circuit of the said battery as extracting medium in the series worked at the lower temperature.

4. In an apparatus for extracting bran and the like, the combination of a battery of extractors intercommunicating with each other and adapted to be worked in two series having different fixed temperatures, with a cooling tank consisting of the tank body containing the liquid to be cooled and of cooling elements contained in the said tank-body, a main arranged as the inlet for the liquid to be cooled into the said tank body and connected by branch tubes to each extractor of the said battery, a suitable number of reheaters, each consisting of an inner tubular vessel connected to the outlet of the extracting liquid to be rewarmed from one extractor and the inlet for the rewarmed extracting liquid into the next following extractor, and of a mantle surrounding the said inner vessel containing the heating liquid, these mantles intercommunicating with each other, a main connected to the outlet for the cooled liquid from the said cooling tank and by branch pipes to the mantle of each of the said reheaters, and tubes connecting each of the said mantles with that extractor of the said battery from which the inner vessel of the same reheater receives the liquid to be reheated.

5. An apparatus for extracting bran and the like, consisting of a battery of closed extractors intercommunicating with each other and adapted to be worked in series having different fixed temperatures, each extractor being provided with a manhole in its top for charging the same with the raw material, with an inlet for the extracting liquid arranged at the upper part of its main-body and connected in the interior of the latter to an annular perforated distributer for this liquid, with a screen adapted to prevent the raw material from rising to the top of the extracting liquid, fixed close beneath the said distributer to the wall of the said main body and having arranged therein in alinement to the above named manhole an opening for charging the raw material therethrough into the space below, which opening is closed during the operation by a screen like lid turning around a pin and kept in position by a hook affixed to the said screen, with a second screen arranged at the lowest part of the said main body for straining the extracting liquid from the raw material, with means for removing the latter when exhausted, and with an outlet pipe arranged in the bottom of the said extractor beneath the said second screen for the exit of the strained liquid.

6. An apparatus for extracting bran and the like, consisting of a battery of closed extractors intercommunicating with each other and adapted to be worked in series having different fixed temperatures, each extractor composed of a cylindrical main body, a conical lower part, a vaulted top and cup-like bottom, being provided with a manhole at its top for introducing the raw material, with an inlet arranged at the upper part of the said main body for the extracting liquid, with a screen-gate valve consisting of two halves bolted together, one half being fixed to the lower end of the said conical lower part and the other half to the upper end of the said cup-like bottom, and of the shutter sliding in grooves of the casing thus formed, worked by a rod moving in a stuffing box attached thereto and framing a screen adapted to strain the extracting liquid from the raw material supported by the same when the said shutter is closed, and at the said cuplike bottom beneath the said screen shutter with a narrow outlet for the strained extracting liquid, and another outlet for the exit of the exhausted raw material, when the said screen shutter is withdrawn.

7. In an apparatus for extracting bran and the like, the combination of a battery of extractors intercommunicating with each other and adapted to be worked in two series having different fixed temperatures, a cylindrical mixing vessel provided with an opening for charging thereinto the fresh raw material to be treated in the said battery and an inlet for the liquid to be mixed therewith, an agitator arranged coaxially to the said mixer, means for rotating the said agitator, means for jerking the same to and fro when required, means for heating the contents of the said mixer to and keeping them at the same temperature prevailing in that series of the said extractors worked at the lower temperature, a main connected by branch pipes to each of the said extractors for leading the most concentrated extract obtained in the said battery to the inlet for liquid into the said mixer, a screen arranged in the lower part of the said mixer and adapted to strain the extract obtained therein, an outlet in the lower part of the said mixer for the mixture produced therein, and an outlet pipe arranged in the bottom part of the said mixer below the said screen for leading the final strained extract obtained to its destination.

8. In an apparatus for extracting bran and the like, the combination of a battery of extractors intercommunicating with each other and adapted to be worked in two series having different fixed temperatures, a cylindrical mixing vessel provided with an opening for charging thereinto the fresh raw material to be treated in the said battery, an inlet for the liquid to be mixed therewith and an agitator, a mantle surrounding the body of the said mixer and having an inlet and outlet, a cooling tank for cooling the extracting liquid obtained in the series of extractors worked at the higher temperature, a pipe connecting the outlet for the cooled liquid from the said cooling tank to the inlet of the said mantle for this liquid to serve therein as heating medium a main connected to the outlet of the said mantle and by branch pipes to each extractor to lead the cooled liquid into that series of said extractors worked at the lower temperature, an outlet for the mixture produced in the said mixer, and means for conveying the said mixture to any extractor of the said battery.

LOUIS CHARLES REESE.